May 9, 1944. A. S. PARKS 2,348,357
GAS AND OIL SEPARATOR
Filed July 14, 1941

Asbury S. Parks.
INVENTOR.
BY J. Vincent Martin
and
Ralph R. Browning
ATTORNEYS.

Patented May 9, 1944

2,348,357

UNITED STATES PATENT OFFICE 2,348,357

GAS AND OIL SEPARATOR

Asbury S. Parks, Houston, Tex.

Application July 14, 1941, Serial No. 402,400

8 Claims. (Cl. 183—2.7)

This invention has to do with the separation of distillate from high pressure natural gas, and with the separation of the lighter and normally gaseous constituents from a complex petroleum mixture at high pressure in such a manner as to produce the greatest possible amount of residual liquid.

When a mixture under a relatively high pressure such as 1000 pounds per square inch is treated in a separator in the usual manner to separate the liquid and the gaseous constituents there will still remain in solution in the liquid a considerable amount of normally gaseous constituents.

It is well known that if the liquid having these gaseous constituents in solution is suddenly opened to the atmosphere so that the pressure thereon is reduced to atmospheric pressure the gases will come out of solution. However, it is also known that if the pressure on the liquid carrying the gases in solution is reduced gradually and the gases as evolved are taken away or removed from contact with the liquid, the amounts of liquids retained as such will be considerably greater than when the liquid is "flashed" to the atmosphere as above referred to.

The principal object of this invention is to provide a means for separating gas and liquid such that the gas in solution in the liquid will be drawn off as it is evolved from the liquid due to reduction in pressure, because it has been found by experience that by so doing the greatest amount of useful constituents will be retained in solution in the liquid.

It is another object of this invention to provide a means whereby a liquid under high pressure containing normally gaseous constituents in solution may be automatically subjected to a gradual pressure reduction so as to remove the dissolved gases with the least possible loss of liquid.

It is a further object to provide such a device which may be employed in connection with a high pressure separator for the purpose of taking the liquid obtained from such separator as it is separated and automatically and relatively gradually reducing the pressure on such liquid to remove the gaseous constituents from the liquid and from the presence of the liquid with the least possible loss of the liquid itself.

Still another object of this invention is to provide a gas and liquid separation apparatus embodying a separator, a storage tank, a conduit placing the gas spaces of the separator and storage tank in communication, a conduit placing the liquid spaces of the separator and storage tank in communication, valves controlling flow through said conduits and discharge from the gas and liquid spaces of the tank, and means responsive to the level of liquid in the tank for actuating all of said valves.

Other objects of this invention will become apparent from the following description taken in conjunction with the accompanying drawing.

Figure 1:
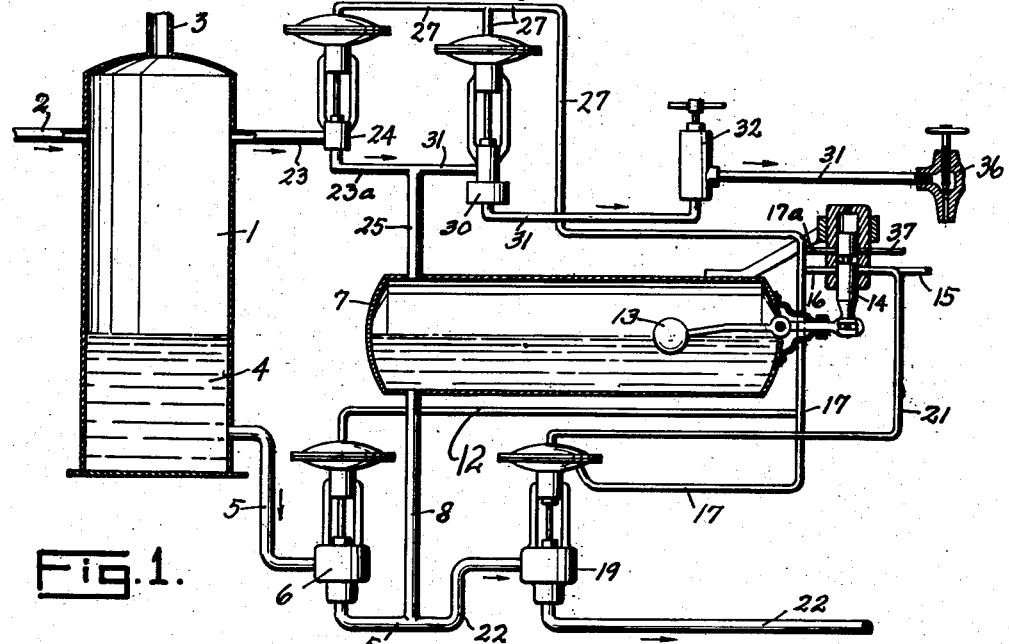
Fig. 1 is a vertical sectional view of a separating apparatus according to the present invention.

Referring to the drawing, there is shown a gas separator 1 having an inlet 2 for the reception of a gas and liquid mixture under a high pressure such as 1000 pounds per square inch. Separator 1 is provided with a vent 3 for the discharge of dry gas and a liquid discharge conduit 5 for draining off the liquid collecting in the bottom of the separator 1 as indicated by reference character 4.

A storage tank 7 is mounted adjacent the separator 1 and is adapted to contain liquid supplied thereto from the separator 1. Communication is provided between the lower portion of the separator 1 and the lower portion of the tank 7 by means of conduits 5, 5a and 8. Communication is also provided between the upper portion of separator 1 and the upper portion of tank 7 by means of connected conduits 23, 23a and 25.

At the junction of conduits 5a and 8, there is connected a conduit 22 for the discharge of liquid from the tank 7. At the junction of conduits 23a and 25, there is connected a conduit 31 for discharging gas from the upper portion of tank 7.

Figures 2, 3, 4, 5:
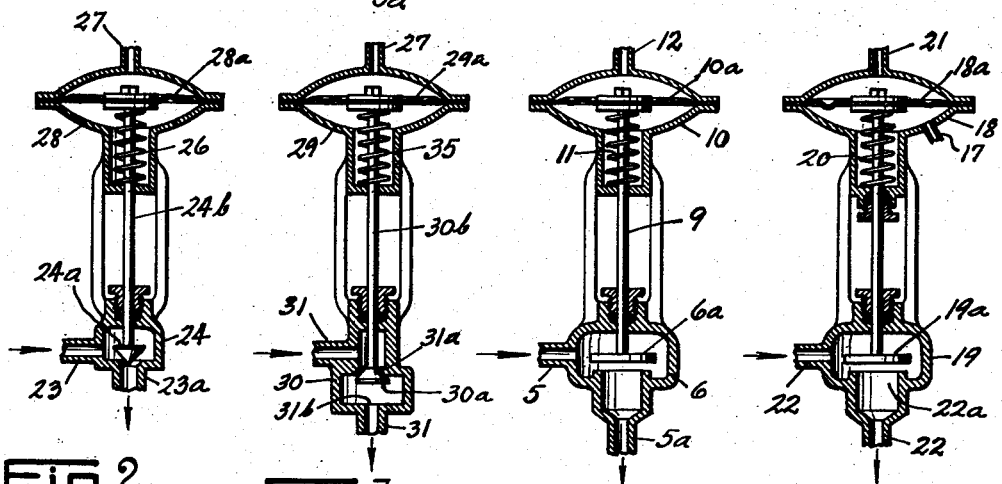
Fig. 2 is a vertical sectional view of a valve for controlling flow of gas from the separator to the storage tank.
Fig. 3 is a similar view of a valve for controlling the flow of gas from the storage tank.
Fig. 4 is another vertical sectional view showing the details of the valve for controlling the flow of liquid from the separator to the storage tank.
Fig. 5 is a similar view showing the valve for controlling the discharge of liquid from the storage tank.

Interposed between the conduits 23 and 23a is a valve 24 which is shown in greater detail in Fig. 2 of the drawing. As illustrated, the body of said valve is provided with an inlet and an outlet port, the latter communicating with conduit 23a and being controlled by a valve element 24a. The latter element is carried on the lower end of a stem 24b which projects through a packing gland in the upper portion of the body 24 and extends upwardly into a diaphragm chamber 28 in which it is connected to the diaphragm 28a. A spring 26 is provided in the diaphragm chamber beneath the diaphragm 28a which serves to retract the valve element 24 from its seat. The upper portion of the diaphragm chamber 28 is connected with a conduit 27 which serves to conduct a fluid under pressure into the diaphragm chamber 28 to act upon the diaphragm 28a to close the valve against the action of spring 26.

Obviously the purpose of valve 24 is to control the communication between the upper portion of the separator 1 and the upper portion of the storage tank 7.

A valve 6 is provided between the conduits 5 and 5a for the discharge of liquid from the bottom of the separator 1. The body of valve 6 as shown in Fig. 4 is provided with an inlet port communicating with conduit 5 and a discharge port communicating with conduit 5a. A valve element of the disc type 6a is mounted in the body 6 and is adapted to seat upon a suitable seat for controlling the flow through the discharge port communicating with conduit 5a. The valve element 6a is carried by a stem 9 projecting through a packing gland in the upper portion of the valve body 6 and extending up into a diaphragm chamber 10 wherein it is connected to a diaphragm 10a. A spring 11 mounted in the lower portion of the diaphragm chamber serves to retract the disc 6a from its seat. A port is provided in the upper portion of the diaphragm chamber 10 to afford communication between the conduit 12 and the interior of the diaphragm chamber 10 to permit access of the pressure fluid to the active face of the diaphragm 10a to close the valve against the action of spring 11.

The construction of disc valve 6 is such that pressure in separator 1 will maintain the valve element 6a on its seat against the action of spring 11 when fluid is released from the diaphragm chamber 10. Spring 11 is calibrated to open the valve when the pressure in separator 1 and tank 7 has become equalized.

Interposed in the gas discharge conduit 31 is a valve 30 the body of which is provided with an inlet port 31a and a discharge port 31b (Fig. 3). A valve element 30a is provided in said valve body for closing the inlet port 31a. Valve element 30a is carried by a stem 30b which extends up into a diaphragm chamber 29 wherein the stem is connected to a diaphragm 29a. A spring 35 is positioned in the lower portion of the diaphragm chamber 29 which serves to seat the valve on its seat to close the port 31a. A fluid under pressure is supplied to the active face of the diaphragm 29a through conduit 27.

A valve 19 is interposed in the discharge conduit 22. In Fig. 5 of the drawing the details of this valve are shown, and it will be noted that a disc valve element 19a is carried on a stem 19b and serves to close the discharge port 22a of the valve. The stem 19 extends upwardly into the diaphragm chamber 18 and is connected therein to the diaphragm 18a. Spring 20 positioned in the lower portion of the diaphragm chamber serves to retract the valve element 19a from its seat. In this valve the lower portion of the valve chamber is of fluid-tight construction, a gland being provided to afford a tight connection between the stem 19 as it enters the lower portion of the diaphragm chamber. The lower face of the diaphragm 18a is subjected to a fluid which enters the lower portion of the chamber 18 through conduit 17. The upper surface of the diaphragm 18a is subjected to a fluid under pressure which enters the upper portion of the chamber through conduit 21, the latter being connected directly to a fluid pressure supply line 15.

The construction of valve 19 is such that the valve will be urged to a closed position against the action of spring 20 by pressure fluid entering the upper portion of the diaphragm chamber 18 through conduit 21. The valve element 19a is also urged onto its seat by the pressure in tank 7. When it is desired to open this valve, pressure fluid is supplied to the lower portion of diaphragm chamber 18 through conduit 17 which balances the pressure of fluid on the upper side of diaphragm 18a. The valve remains closed however until pressure exerted on the disc 19a from fluid in tank 7 is decreased sufficiently to enable spring 20 to open the valve.

Figure 6:
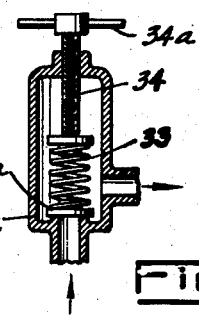
Fig. 6 is a similar view of a gas pressure release valve.

In addition to the valve 30 a second valve 32 is provided in the gas discharge line 31. As shown in Fig. 6, the valve 32 is a back-pressure valve and comprises a valve element 32a which is urged onto its seat by means of a spring 33 for closing the inlet port. The force exerted by the spring on the valve element 32a is controlled by a threaded stem 34, the position of which is controlled by the handle 34a. This valve serves to permit the flow of gas from tank 7 until the pressure has dropped to a predetermined value and then prevents the further release of gas from tank 7.

A throttle valve 36 serves for the final control of the discharge of gas through the conduit 31.

Fluid under pressure is supplied to the valve control diaphragms through a supply conduit 15. The conduit 21 for supplying fluid under pressure to the upper portions of valve chamber 18 is directly connected to the supply conduit 15. The flow of fluid under pressure from the supply conduit 15 to the conduits 27, 17 and 12 is controlled by a slide valve 14, which is slidably mounted in a casing as shown in Fig. 1. The casing containing valve 14 is provided with an inlet port communicating with conduit 15 and discharge port communicating with conduit 16. The latter is connected to conduits 17 and 27. The casing of valve 14 is also provided with an inlet port communicating with conduit 17a which is connected to conduits 17 and 27 and with a discharge port connected to a discharge conduit 37. When the valve 14 is in its lower position communication is provided between the conduits 15 and 16 for supplying a fluid under pressure to the conduits 17, 12 and 27, and when the valve 14 is in its uppermost position, communication is provided between the conduits 17a and 37 to permit discharge of fluid from the conduits 17, 12 and 27.

Valve 14 is connected at its lower end to a pivoted arm of a float 13 which is positioned within the tank 7. With this construction the level of liquid in the tank 7 controls the position of the valve 14.

In operation of the apparatus herein described the mixture to be separated is introduced into the separator 1 through the inlet line 2. As at the beginning of the procedure there is no liquid in the tank 7, the float 13 will be at its lower position and this will force the slide valve 14 to its uppermost position to relieve any pressure of fluid in the upper portions of the diaphragms of valves 6, 24 and 30 and it will relieve any pressure in the lower portion of the diaphragm chamber of valve 19. Under these conditions valves 19 and 30 will be closed, valve 23 will be opened, and valve 6 will be opened upon rise of pressure in tank 7. Thus, free communication will be established, first between the upper or gas spaces of separator 1 and tank 7, and later between the liquid spaces of said separator and tank. As the gas and liquid mixture is passed into the separator, the gas will pass out through the vent 3 and the liquid will settle in the separator and pass through the conduits 5a and 8 into the tank 7. The pressure within the tank 7 will be maintained the same as in the separator by means of gas which will pass through the lines 23, 23a and 25 between the separator and tank.

As the liquid rises in the separator, it will assume the same level within the tank 7. When the liquid reaches a predetermined level within the tank 7 the float 13 will cause the valve 14 to be moved to a position to permit fluid under pressure to pass from the conduit 15 through the valve 14, conduit 16 and into communicating conduits 17, 27 and 12. This will cause the pressure in the upper portions of diaphragm chambers 10, 28 and 29 to be increased sufficiently to close valves 6 and 24 and to open valve 30. The supply of fluid under pressure to the conduit 17 will also serve to increase the pressure in the lower portion of the diaphragm chamber 18 to balance the pressure supplied to the upper portion of the chamber 18 through the conduit 21 directly connected to conduit 15, and the spring 20 will thereby tend to open the valve 19, but will be unable to do so until pressure of fluid in tank 7 has dropped.

Under these conditions communication between the tank 7 and the separator 1 will be completely shut off and gas will flow from the upper portion of tank 7 through conduits 25 and 31. The discharge of gas through the conduit 31 will be controlled by the valves 32 and 36. The valve 19, however, will not open due to the high pressure exerted thereon by the liquid and gas in the tank 7. Gas will bleed off through the conduits 25 and 31 and the back pressure valve 32 and the needle or throttle valve 36. As this pressure drops, the lighter constituents will begin to come out of solution in the liquid in tank 7 and will in turn be bled off. Due to the bleeding off of the lighter constituents as they are evolved, the resulting concentration of heavier constituents in the gas and liquid within the tank 7 will be greater for any given pressure drop than if the pressure drop were achieved merely by expansion of the size of the tank or the container, or by reduction of the pressure without withdrawing any portion of the mixture. When the pressure within the tank 7 drops to a predetermined point, its effect on the valve 19 will decrease to such an extent that this valve may be opened by the spring 20. When this occurs, there will still be a relatively low pressure existing within the tank 7, the same having been held therein by closure of the back pressure valve 32. This pressure will cause the efficient ejection of the liquid remaining within the tank 7 and this liquid will flow through the valve 19 and line 22 to storage or to a pipe line.

When the level of the liquid in the tank 7 drops to a predetermined point, the lowering of the float 13 and the shifting of the valve 14 will shut off the application of pressure fluid to the diaphragms of the various valves and will vent to the atmosphere through the line 37 the pressure fluid previously applied to such diaphragms. With such pressure fluid vented, the valves 19 and 30 will immediately close and the valve 24 will open. The valve 6, however, will not immediately open because of the pressure of the liquid within the separator which is still exerted upon its upper surface. However, with the valves 19 and 30 closed and the valve 24 open the pressure within the tank 7 will be quickly raised to the same as the pressure within the separator 1 whereupon the pressures on the two faces of the valve 6 will be equalized and the valve 6 will open permitting the tank 7 to again be filled with liquid as before.

Having described my invention, I claim:

1. An apparatus for separating gas and liquid from a mixture thereof comprising a separator for separating gas from liquid under high pressure, a tank, a conduit connecting the upper portions of the separator and tank together, a conduit connecting the lower portions of the separator and tank together, a valve in each of said conduits, a gas discharge conduit for discharging gas from the upper portion of the tank, a liquid discharge conduit for discharging liquid from the tank, valves in said discharge conduits, the valve in the conduit connecting the lower portions of the separator and tank having a valve element therein urged to a closed position by the pressure of fluid in said separator, means urging said valve element to an open position whereby said valve element will open upon the equalization of pressure in said separator and tank, the valve in the tank liquid discharge conduit having a valve element therein urged to a closed position by pressure of fluid in the tank, means urging said last mentioned valve element to an open position whereby decrease of pressure in said tank below a predetermined value will enable said valve element to move to an open position, and means responsive to variations in the level of liquid in the tank for controlling said valves.

2. An apparatus for separating gas and liquid from a mixture thereof comprising a separator for separating gas from liquid under high pressure, a tank, a conduit connecting the upper portions of the separator and tank together, a conduit connecting the lower portions of the separator and tank together, a valve in each of said conduits, a gas discharge conduit for discharging gas from the upper portion of the tank, a liquid discharge conduit for discharging liquid from the tank, valves in said discharge conduits, the valve in the conduit connecting the lower portions of the separator and tank having a valve element therein urged to a closed position by the pressure of fluid in said separator, means urging said valve element to an open position whereby said valve element will open upon the equalization of pressure in said separator and tank, the valve in the tank liquid discharge conduit having a valve element therein urged to a closed position by pressure of fluid in the tank, means urging said last mentioned valve element to an open position whereby decrease of pressure in said tank below a predetermined value will enable said valve element to move to an open position, fluid pressure actuated means associated with the valves in the conduits connecting the separator and tank for closing said valves, fluid pressure actuated means associated with the valve in the gas discharge conduit for opening said valve, fluid pressure actuated means associated with the valve in the liquid discharge conduit to permit opening of said valve, and means responsive to a predetermined rise in the level of liquid in the tank for energizing said fluid actuated means.

3. An apparatus for separating gas and liquid from a mixture thereof comprising a separator for separating gas from liquid under high pressure, a tank, a conduit connecting the upper portions of the separator and tank together, a conduit connecting the lower portions of the separator and tank together, a valve in each of said conduits, a gas discharge conduit for discharging gas from the upper portion of the tank, a liquid discharge conduit for discharging liquid from the tank, valves in said discharge conduits, the valve in the conduit connecting the lower portions of the separator and tank having a valve element therein urged to a closed position by the pressure of fluid in said separator, means urging said valve element to an open position whereby said valve element will open upon the equalization of pressure in said separator and tank, the valve in the tank liquid discharge conduit having a valve element therein urged to a closed position by pressure of fluid in the tank, means urging said last mentioned valve element to an open position whereby decrease of pressure in said tank below a predetermined value will enable said valve element to move to an open position, fluid pressure actuated means associated with the valves in the conduits connecting the separator and tank for closing said valves, fluid pressure actuated means associated with the valve in the gas discharge conduit for opening said valve, fluid pressure actuated means associated with the valve in the liquid discharge conduit to permit opening of said valve, means responsive to a predetermined rise in the level of liquid in the tank for energizing said fluid actuated means, and a back pressure valve in said gas discharge conduit to limit the decrease in pressure in said tank upon opening of the fluid pressure opened valve in said conduit.

4. An apparatus for separating gas and liquid from a mixture thereof comprising a separator for separating gas from liquid under high pressure, a tank, a conduit connecting the upper portions of the separator and tank together, a conduit connecting the lower portions of the separator and tank together, a valve in each of said conduits, a gas discharge conduit for discharging gas from the upper portion of the tank, a liquid discharge conduit for discharging liquid from the tank, valves in said discharge conduits, the valve in the conduit connecting the lower portions of the separator and tank having a valve element therein urged to a closed position by the pressure of fluid in said separator, means urging said valve element to an open position whereby said valve element will open upon the equalization of pressure in said separator and tank, the valve in the tank liquid discharge conduit having a valve element therein urged to a closed position by pressure of fluid in the tank, means urging said last mentioned valve element to an open position whereby decrease of pressure in said tank below a predetermined value will enable said valve element to move to an open position, fluid pressure actuated means associated with the valves in the conduits connecting the separator and tank for closing said valves, fluid pressure actuated means associated with the valve in the gas discharge conduit for opening said valve, fluid pressure actuated means associated with the valve in the liquid discharge conduit for urging said valve to a closed position, a second fluid pressure actuated means associated with said valve in the liquid discharge conduit for opposing the closing effort of the first fluid pressure actuated means associated therewith, a fluid pressure supply line, means for supplying fluid from said line to fluid pressure actuated means urging the valve in the liquid discharge conduit to a closed position, and valve means responsive to a predetermined rise in the level of liquid in said tank for admitting fluid under pressure from the supply line to the fluid pressure actuated means associated with said valves to close the valves in the conduits connecting the separator and tank, open the valve in the gas discharge conduit and neutralize the effect of the fluid pressure actuated means urging the valve in the liquid discharge to a closed position to enable said last mentioned valve to open upon decrease of pressure in said tank.

5. An apparatus for separating gas and liquid from a mixture thereof comprising a separator for separating gas from liquid under high pressure, a tank, a conduit connecting the upper portions of the separator and tank together, a conduit connecting the lower portions of the separator and tank together, a valve in each of said conduits, a gas discharge conduit for discharging gas from the upper portion of the tank, a liquid discharge conduit for discharging liquid from the tank, valves in said discharge conduits, the valve in the conduit connecting the lower portions of the separator and tank having a valve element therein urged to a closed position by the pressure of fluid in said separator, means urging said valve element to an open position whereby said valve element will open upon the equalization of pressure in said separator and tank, the valve in the tank liquid discharge conduit having a valve element therein urged to a closed position by pressure of fluid in the tank, means urging said last mentioned valve element to an open position whereby decrease of pressure in said tank below a predetermined value will enable said valve element to move to an open position, fluid pressure actuated means associated with the valves in the conduits connecting the separator and tank for closing said valves, fluid pressure actuated means associated with the valve in the gas discharge conduit for opening said valve, fluid pressure actuated means associated with the valve in the liquid discharge conduit for urging said valve to a closed position, a second fluid pressure actuated means associated with said valve in the liquid discharge conduit for opposing the closing effort of the first fluid pressure actuated means associated therewith, a fluid pressure supply line, means for supplying fluid from said line to fluid pressure actuated means urging the valve in the liquid discharge conduit to a closed position, valve means responsive to a predetermined rise in the level of liquid in said tank for admitting fluid under pressure from the supply line to the fluid pressure actuated means associated with said valves to close the valves in the conduits connecting the separator and tank, open the valve in the gas discharge conduit and neutralize the effect of the fluid pressure actuated means urging the valve in the liquid discharge to a closed position to enable said last mentioned valve to open upon decrease of pressure in said tank, and a back pressure valve in said gas discharge conduit to limit the decrease in pressure in said tank upon opening of the fluid pressure opened valve in said conduit.

6. An apparatus for separating gas and liquid from a mixture thereof comprising a separator for separating gas from liquid under high pressure, a tank, a conduit connecting the upper portions of the separator and tank together, a conduit connecting the lower portions of the separator and tank together, a valve in each of said conduits, a gas discharge conduit for discharging gas from the upper portion of the tank, a liquid discharge conduit for discharging liquid from the tank, valves in said discharge conduits, the valve in the conduit connecting the lower portions of the separator and tank having a valve element therein urged to a closed position by the pressure of fluid in said separator, means urging said valve element to an open position whereby said valve element will open upon the equalization of pressure in said separator and tank, the valve in the tank liquid discharge conduit having a valve element therein urged to a closed position by pressure of fluid in the tank, means urging said last mentioned valve element to an open position whereby decrease of pressure in said tank below a predetermined value will enable said valve element to move to an open position, fluid pressure actuated means associated with the valves in the conduits connecting the separator and tank for closing said valves, fluid pressure actuated means associated with the valve in the gas discharge conduit for opening said valve, fluid pressure actuated means associated with the valve in the liquid discharge conduit for urging said valve to a closed position, a second fluid pressure actuated means associated with said valve in the liquid discharge conduit for opposing the closing effort of the first fluid pressure actuated means associated therewith, a fluid pressure supply line, means for supplying fluid from said line to fluid pressure actuated means urging the valve in the liquid discharge conduit to a closed position, valve means responsive to a predetermined rise in the level of liquid in said tank for admitting fluid under pressure from the supply line to the fluid pressure actuated means associated with said valves to close the valves in the conduits connecting the separator and tank, open the valve in the gas discharge conduit and neutralize the effect of the fluid pressure actuated means urging the valve in the liquid discharge to a closed position to enable said last mentioned valve to open upon decrease of pressure in said tank, and means including said liquid level responsive valve means operable upon a predetermined decrease in liquid level in said tank for releasing pressure fluid from the fluid actuated means associated with the valves to close the valves in the gas and liquid discharge conduits to open the valve in the conduit connecting the upper portions of the separator and tank and permit liquid in the separator to open the valve in the conduit connecting the lower portions of said separator and tank.

7. An apparatus for separating gas and liquid comprising a tank, supply valve means for controlling the supply of a liquid under pressure having a gas entrained therein to said tank, a gas discharge valve controlling the discharge of gas from the upper portion of said tank to a region of reduced pressure, a liquid discharge valve controlling the discharge of liquid from the lower portion of said tank, means responsive to the level of liquid in said tank operative upon a predetermined drop of level in said tank for closing the gas and liquid discharge valves and opening the supply valve means, and operative upon a predetermined rise of liquid in said tank for closing said supply valve means, opening the gas discharge valve and urging the liquid discharge valve to an open position, and said liquid discharge valve including pressure responsive means maintaining said liquid discharge valve closed until a predetermined pressure drop is effected.

8. An apparatus for separating gas and liquid comprising a tank, means for supplying a liquid under pressure having gas entrained therein to said tank, a valve controlling communication between said supply means and the upper portion of said tank, a valve controlling communication between the supply means and the lower portion of said tank, a valve controlling discharge of gas from the upper portion of said tank, a valve for controlling discharge of liquid from the lower portion of said tank, means responsive to the level of liquid in said tank operative upon a predetermined drop of liquid level in said tank for opening the valves placing the supply means in communication with said tank while closing the gas and liquid discharge valves and operative upon a predetermined rise of liquid in said tank for closing the valves placing the supply means in communication with said tank while opening the gas discharge valve and urging the liquid discharge valve to an open position, and said liquid discharge valve including means responsive to the pressure in said tank for maintaining the liquid discharge valve closed until the pressure in said tank is reduced to a predetermined value.

ASBURY S. PARKS.